United States Patent
Lin

(10) Patent No.: US 7,080,951 B2
(45) Date of Patent: Jul. 25, 2006

(54) LASER POINTER WITH EXTERNAL DEVICE CONNECTOR

(76) Inventor: Wei-Jong Lin, 6F-11, No. 8, Sec. 1, Jungshing Rd., Wugu Shiang, Taipei Hsien (TW)

(*) Notice: Subject to any disclaimer, the term of this patent is extended or adjusted under 35 U.S.C. 154(b) by 0 days.

(21) Appl. No.: 10/838,211

(22) Filed: May 5, 2004

(65) Prior Publication Data
US 2005/0226679 A1    Oct. 13, 2005

(30) Foreign Application Priority Data
Apr. 7, 2004   (TW) .............................. 93205298 U

(51) Int. Cl.
*B43K 29/00*   (2006.01)
(52) U.S. Cl. ................... 401/195; 362/118; 362/259

(58) Field of Classification Search ................. 401/52, 401/195; 362/109, 118, 253, 259, 800
See application file for complete search history.

(56) References Cited

U.S. PATENT DOCUMENTS

| 5,193,897 | A | * | 3/1993 | Halsey ................. 362/118 |
| 5,307,253 | A | * | 4/1994 | Jehn .................... 362/259 |
| 5,617,304 | A | * | 4/1997 | Huang .................. 362/118 |
| 5,988,832 | A | * | 11/1999 | Chen .................... 362/259 |
| 6,575,596 | B1 | * | 6/2003 | Butt .................... 362/259 |

* cited by examiner

*Primary Examiner*—David A. Scherbel
*Assistant Examiner*—Huyen Le
(74) *Attorney, Agent, or Firm*—Troxell Law Office, PLLC

(57) ABSTRACT

A laser pointer with external device connector comprising a laser pointer offers pointing function, a hollow external connector with the size corresponding to the objects to be connected.

7 Claims, 4 Drawing Sheets

LASER POINTER WITH EXTERNAL DEVICE CONNECTOR

BACKGROUND OF THE INVENTION

I. Field of the Invention

This invention relates generally to a laser pointer and, more specifically, to a laser pointer with external device connector that can connect to other external devices, such a writing device.

II. Description of the Prior Art

Heretofore, it is known that laser pointers are often seen in our daily life. The purpose of laser pointer is for users to point to specific location or object, therefore laser pointers are used in the classrooms or speeches.

The known laser pointers are sub-divided into two types, one of them has lighting device only and is for pointing purpose, the other type combines with writing device, such as pens for both writing and pointing; basically both types are designed in definite configuration without capability to connect to other objects.

In the real application, while using laser pointers, writing function is accompanied; in the classrooms and speeches, when lecturers apply laser pointers, they still apply white board to write and illustrate for further explanation, therefore they hold microphone with one hand, the other hand (usually right hand) holds the laser pointer and pen at the same time, such is not convenient and might effect lecturers performance. If the laser pointers cannot combine writing function, users have to carry both of them separately, such also introduce inconvenience.

SUMMARY OF THE INVENTION

It is therefore a primary object of the invention to provide a laser pointer with external device connector that combines a laser pointer and an external device for more convenient carrying and application.

In order to achieve the objective set forth, a laser pointer with external device connector in accordance with the present invention comprises a laser pointer offers pointing function, a hollow external connector with the size corresponding to the objects to be connected.

BRIEF DESCRIPTION OF THE DRAWINGS

The accomplishment of the above-mentioned object of the present invention will become apparent from the following description and its accompanying drawings which disclose illustrative an embodiment of the present invention, and are as follows.

DESCRIPTION OF THE PREFERRED EMBODIMENT

Figure 1:
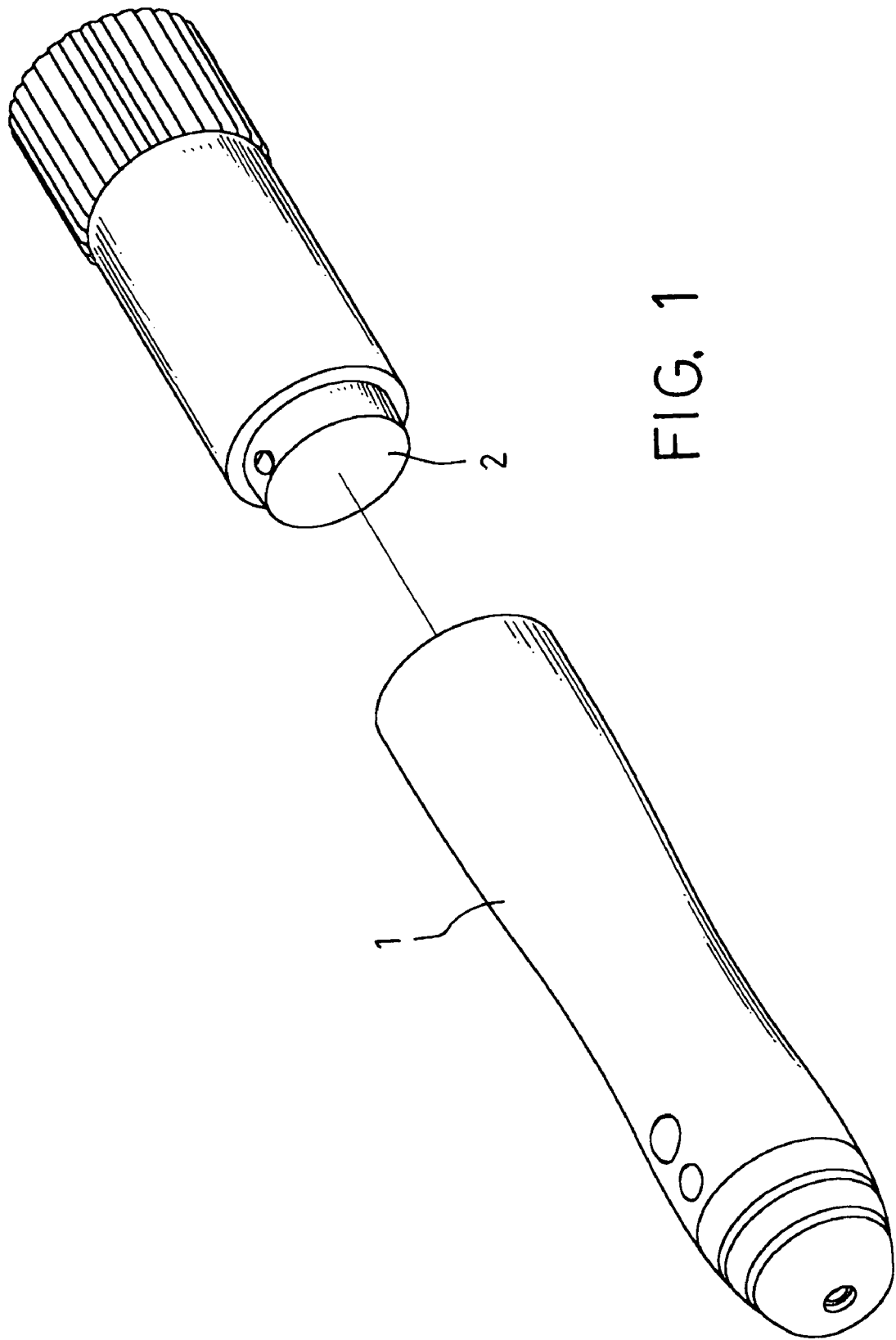
FIG. 1 is a perspective view of the present invention.

Referring to FIG. 1, the laser pointer 1 is a known device with a battery, a switch and an open, the opposite side of the open has a hollow external connector 2 with the size corresponding to the external objects; the external devices are not limited to writing devices, the other possible devices might be Flash-ROM memory, portable CD player or other portable devices; an example is white-board marker pen A.

The external connector 2 of the present invention can connect to the cap B of the white-board marker pen A, or directly to C that near to the writing tip of the marker pen A, or to the end D of the marker pen A that can shorten the total length.

Figure 2:
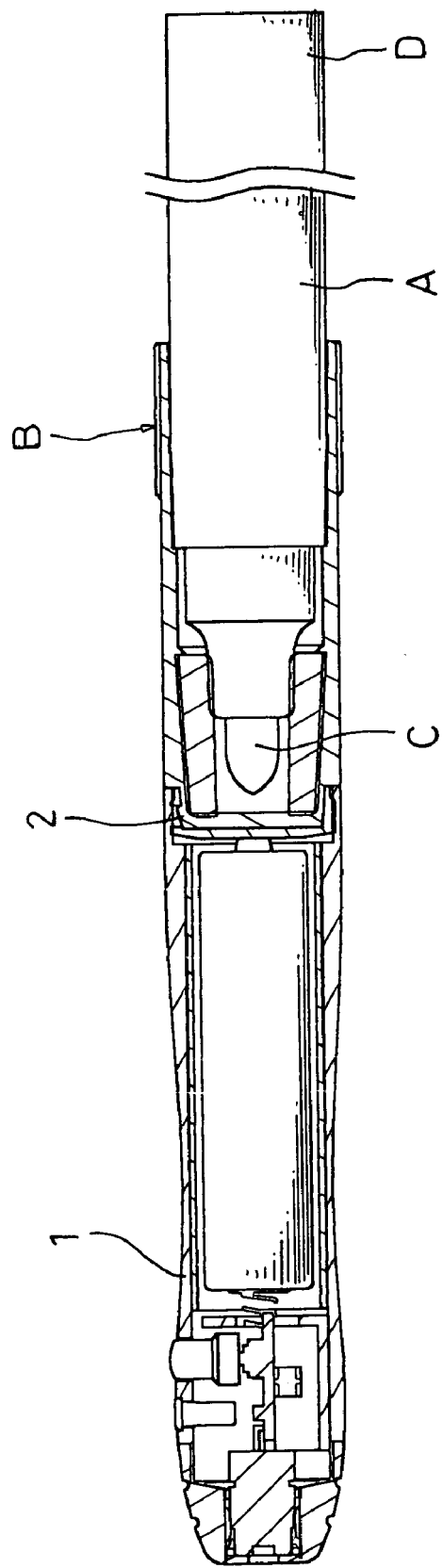
FIG. 2 is a cross-sectional view of the present invention.

The external connector 2 can be a sleeve or threads inside to connect to the external objects; the external objects should have corresponding threads to connect to the threads inside. FIG. 2 shows the cross-sectional view of the white-board marker pen with the external connector 2.

To avoid the total length after connection is too long, the laser pointer 1 can apply a single powerful battery to replace the known double batteries designs; Mercury button cell batteries can also be applied.

The application of the present invention can combine the laser pointer 1 with the writing devices and other portable devices to avoid carry them separately that might cause inconvenience while carrying and application.

Figure 3:
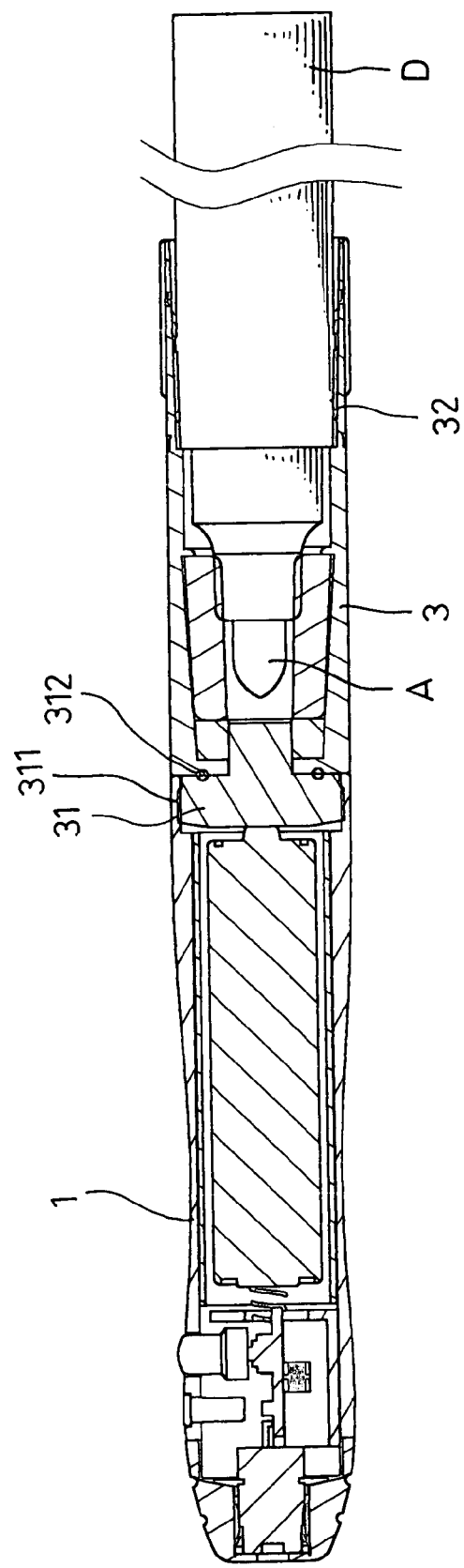
FIG. 3 is a cross-sectional view of another application of the present invention.
Figure 4:
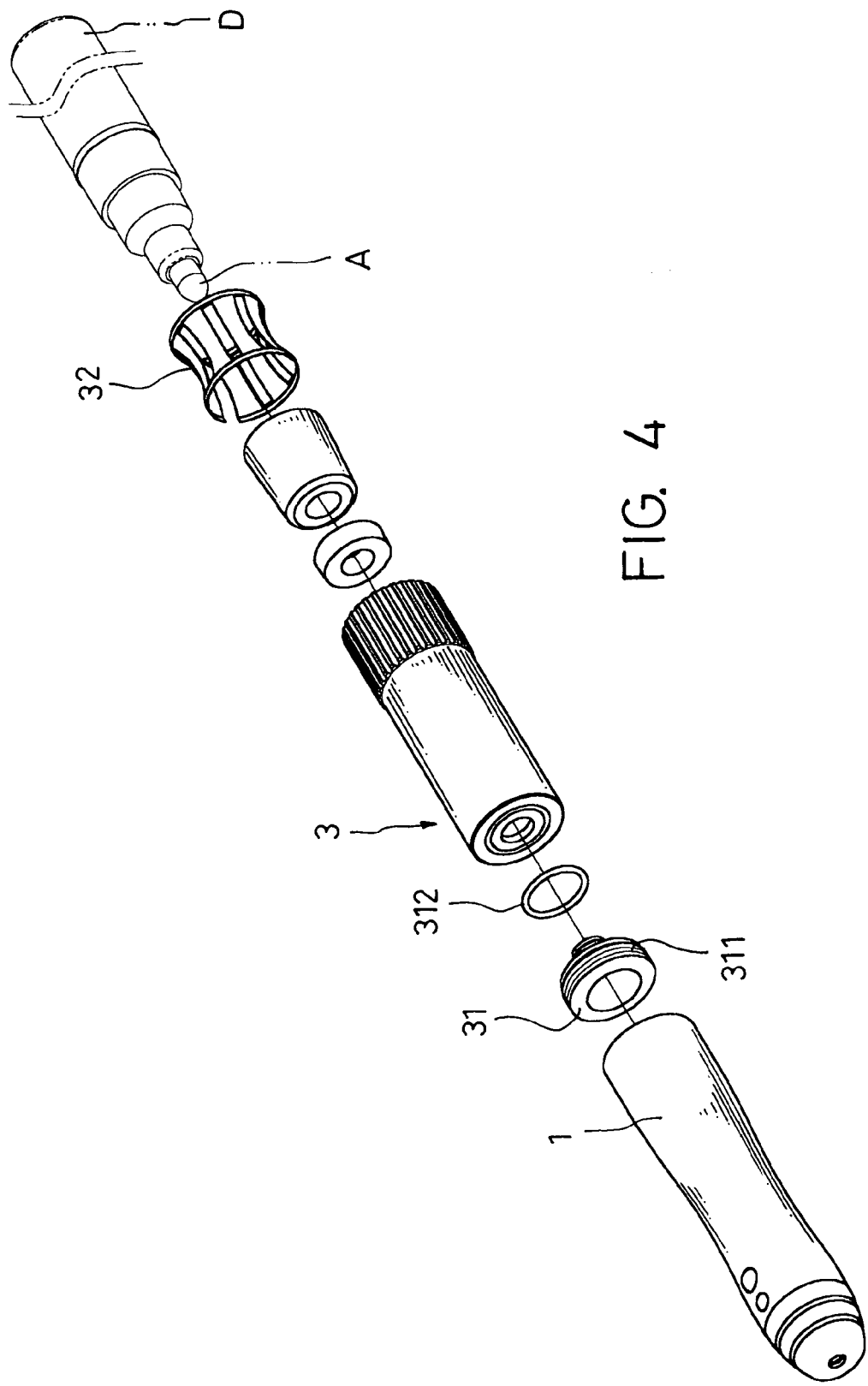
FIG. 4 is an assembly view of another application of the present invention.

FIGS. 3 and 4 show another application example of the present invention, a replacement cap 3 with the same size of the cap to replace the original cap; the replacement cap 3 connects to an intermedium 31; one end of the intermedium 31 is fixed inside the replacement cap 3, the other end is a connecting part 311 connects to the laser pointer 1, to connect with threads, for example, the inner wall of the laser pointer 1 should have the corresponding threads; the connecting part 311 can be a sleeve to wrap the laser pointer 1. If the external object is a marker pen, a sealing ring 312 is installed to prevent the marker pen from drying out; such scheme can replace the original cap, at the same time remain the laser pointer function.

In order to have better and tighter connection, the back inner wall of the replacement cap 3 is covered with a soft cushion 32.

While a preferred embodiment of the invention has been shown and described in detail, it will be readily understood and appreciated that numerous omissions, changes and additions may be made without departing from the spirit and scope of the invention.

What is claimed is:

1. A laser pointer assembly comprising:
   a) a laser pointer having an external device connector and at least one battery located therein, and providing a pointing function;
   b) a replacement cap having a first cap end and a second cap end;
   c) an intermedium having a connecting part located on a first end thereof, the connecting part being connected to the external device connector and having a surface engaging the at least one battery, and a second end of the intermedium is connected to the first cap end of the replacement cap, a sealing ring located between engaging surfaces of the replacement cap and the intermedium and creating a seal therebetween; and
   d) an object removably inserted into an opening in the second cap end.

2. The laser pointer assembly according to claim 1, wherein the connecting part is threadedly connected to the external device connector.

3. The laser pointer assembly according to claim 1, wherein the second end of the intermedium is threadedly connected to the first cap end.

4. The laser pointer assembly according to claim 1, wherein the object is a writing device.

5. The laser pointer assembly according to claim 1, wherein the object is a white-board marker-pen.

6. The laser pointer assembly according to claim 1, wherein the object is a portable-pen shaped object.

7. The laser pointer assembly according to claim 1, wherein the replacement cap having a soft cushion located in the opening in the second cap end thereof.

* * * * *